Patented Sept. 12, 1933

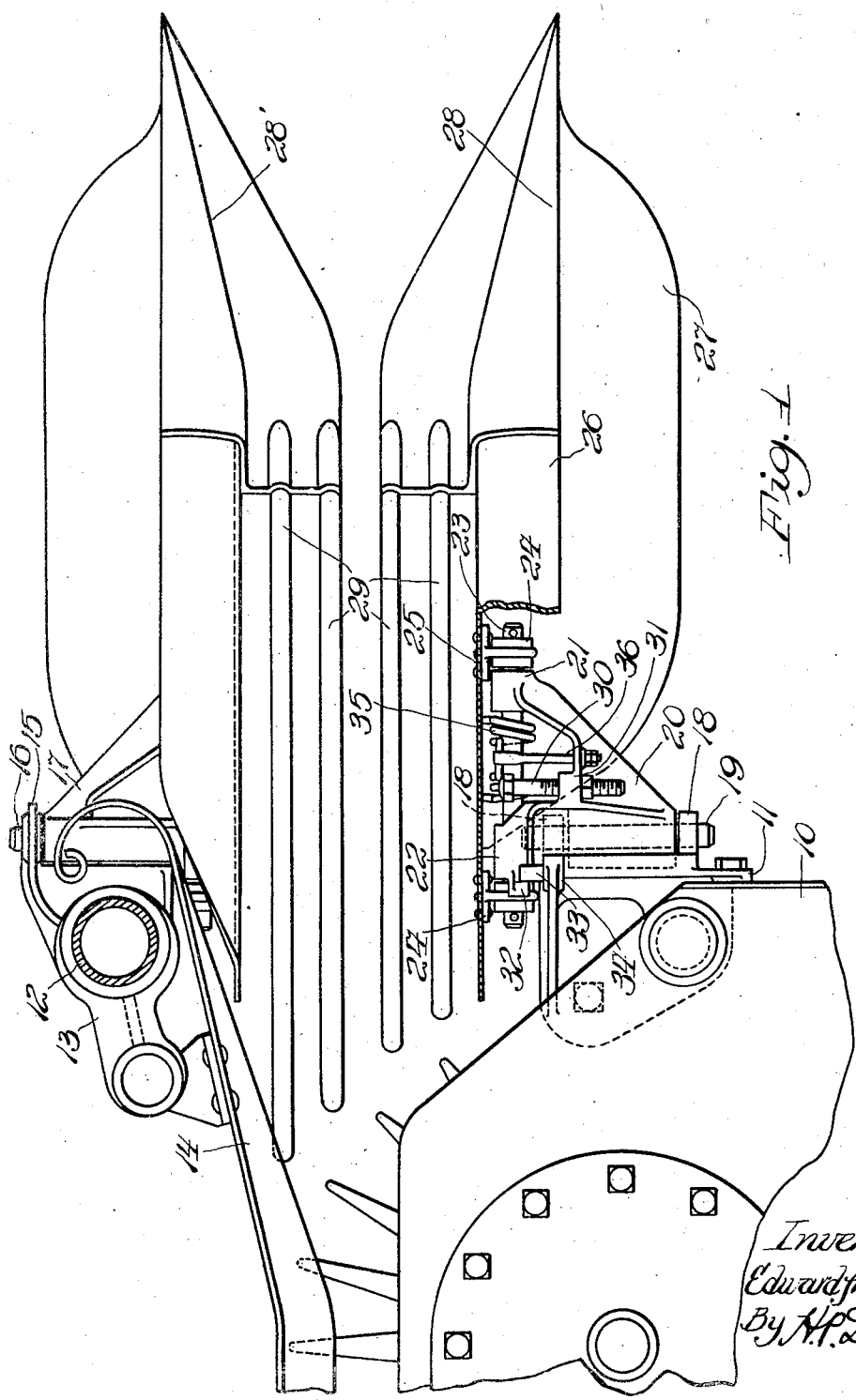

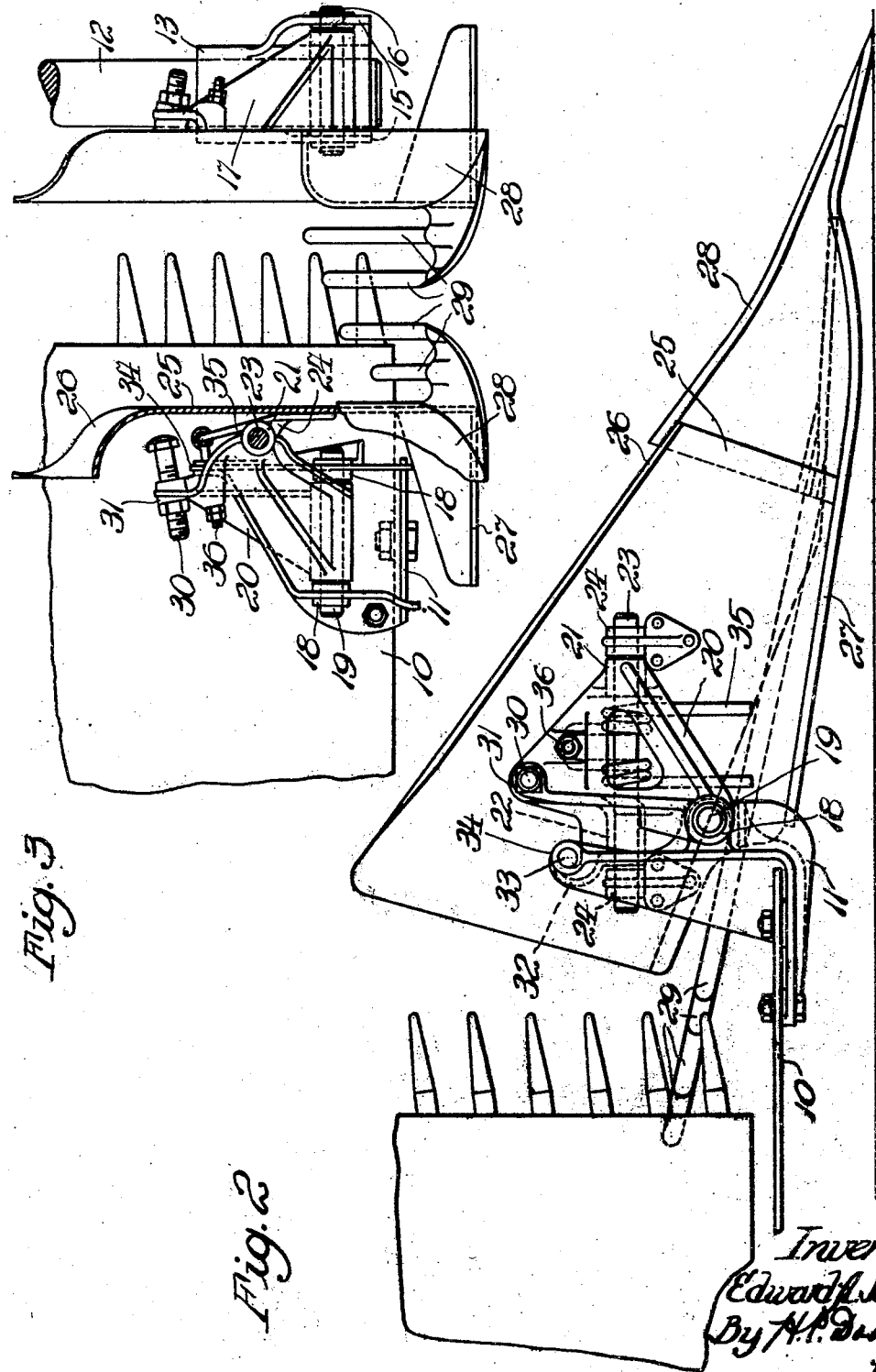

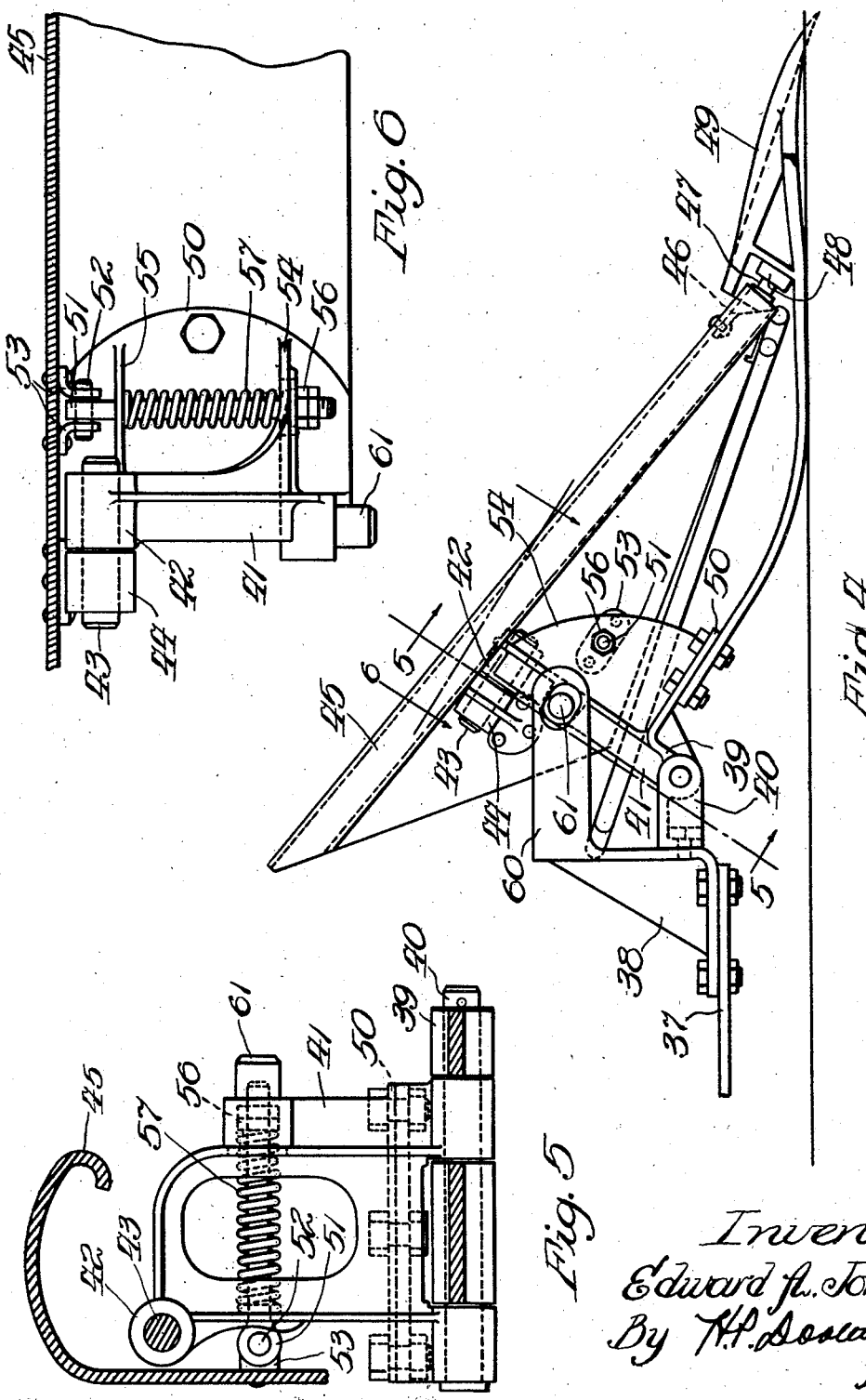

1,926,338

UNITED STATES PATENT OFFICE 1,926,338

PLANT LIFTER FOR COTTON HARVESTERS

Edward A. Johnston, Chicago, Ill., assignor to International Harvester Company, a corporation of New Jersey Application April 22, 1932. Serial No. 606,775

6 Claims. (Cl. 56—14)

This invention relates to dividers for harvesting machines.

More specifically it relates to plant lifting and guiding devices for row crop harvesters such as cotton pickers.

The principal object of the invention is to provide an improved lifting and guiding device for row crop implements which closely follows the contour of uneven ground.

Another more specific object is to provide a pivotally mounted divider particularly adapted to flexibly follow the irregularities occurring along adjacent rows of plants such, for example, as slanting side hills.

Another object is to provide a pivoted plant lifting device which is mounted in such a manner that the delivery end of the guiding means formed on the device is at all times in close proximity to the operating units of a harvesting machine, for example the spindles of a cotton picking drum.

Other more specific objects, such as the provision of stops to limit the pivotal movements of the members forming the device, will be apparent from the detailed description to follow.

The objects of the invention are obtained by pivotally connecting a plant lifting or guiding member to a harvesting machine on both transverse and longitudinal axes whereby the member may tip up and down and may tilt sideways to accommodate all types of soil irregularities.

These objects have been obtained by certain constructions as shown in the attached drawings. in which:

Figure 1 is a plan view showing an embodiment of the invention as a plant guiding and lifting device for a cotton picker. Only such parts of the picker are shown as are necessary to illustrate the functioning of the device.

Figure 2 is a side elevation of the same construction shown in Figure 1.

Figure 3 is a front view of the construction shown in Figure 1, one of the lifting members being broken away in section to show the pivotal connections of the member with the frame of the cotton picker.

Figure 4 is a side elevation showing a modified form of the invention.

Figure 5 is a sectional view taken on the line 5—5 of Figure 4; and

Figure 6 is a sectional view taken on the line 6—6 of Figure 4.

The portion of a cotton picker shown in Figure 1 is of a conventional construction such as shown in U. S. Patent No. 1,737,850, in which a frame structure supports a vertical picking drum having a plurality of radially extending picking spindles, the drum and spindles being rotated by suitable mechanism. As shown in Figure 1, the frame structure 10, which carries the picking drum, forms a support for a bracket 11 which is rigidly secured to the frame structure 10. Opposite the picking drum a pipe 12, which is part of the frame structure of the cotton picker, supports a bracket 13 in a rigid position. Said bracket constitutes a portion of the support for a pivoted shield 14 which extends in close proximity to the spindles of the picking drum. Said shield is mounted to swing away from the drum for the passage of plants between the drum and the shield, as shown in the patent above referred to.

The bracket 13 is provided with two forwardly directed spaced extensions 15 which form supports for a pivot pin 16, on which a supporting member 17 is pivotally attached. At the other side of the picker frame the bracket 11 is formed with forwardly directed spaced extensions 18, which support a transversely extending pivot pin 19. Said pin is in transverse alignment with the pin 16, whereby the two divider units rock on the same transverse axis. A supporting member 20 is pivoted on the pin 19. It will be understood that the members 17 and 20 are substantially the same in structure and function, one of them being left-handed with respect to the other. As the drawing has been broken away to show the member 20, it will be described in detail with the understanding that the pivotal connections of the member 17 are substantially the same.

The member 20 is formed with two laterally projecting extensions 21 and 22. The extension 22 is formed inwardly from the inner extension 18 and is spaced somewhat above said extension, as shown in Figure 2. The extension 21 is spaced forwardly from the extension 22. Each of the extensions 21 and 22 is formed with a bore extending therethrough, said bores being in substantially longitudinal alignment, that is, substantially parallel to the line of travel of the machine. The axis of the bores is also substantially horizontal, that is, substantially parallel with the ground level. A pivot pin 23 extends through the bores formed in the extensions 21 and 22 and through bearing brackets 24 positioned, respectively, forwardly of the extension 21 and rearwardly of the extension 22. The brackets 24 are secured by rivets to a substantially vertical plate 25.

The vertical portion of the plate 25 is shaped, as best shown in Figure 2, to form an upwardly extending shield for the divider. The top edge of the vertical portion has a downward slant and a flange portion 26 extends outwardly from the top of the vertical portion. As best shown in Figure 2, a second horizontal portion 27 extends laterally outwardly from the bottom of the vertical portion. A pointed shoe 28 is connected to the forward end of the shield member having the plate portions, as described. Said shoe is formed with a centrally and rearwardly extending inner portion, to which a pair of rods 29 are attached. The shoe 28 and the portions of the plate making up the divider are constructed by welding the various elements together. It is understood that the parts may be joined in any suitable manner. The other shoe 28' is formed substantially the same as the shoe 28 and with the corresponding plates secured thereto, forms the divider at that side of the machine. Said divider is connected to the supporting member 17 in the same manner as above described; this connection not being described in detail as it would be essentially a duplication of the above description.

From the description already given, it will be understood that the supporting bracket 20 rocks about the pin 19 on a transverse axis with respect to the frame structure 10 of the machine. This allows the divider to tip up and down during movement of the machine. Also the shoe 28, together with its associated parts which form the divider, may rock about the pin 23 on a horizontal longitudinal axis with respect to the supporting member 20 and also with respect to the frame structure 10 of the machine. It has been found desirable to provide certain limits for these two pivotal movements. To limit the outward rocking movement of the top of the plate 25, and, of course, the entire divider of which this plate is a part, a stop is provided, formed by a bolt 30 threaded into an upwardly extending lug 31 formed on the supporting member 20. A nut is provided to hold the bolt securely in position. By adjusting the position of the bolt 30 an adjustable stop is provided, the plate 25 abutting against the head of the bolt 30 after an angular movement determined by the position of said bolt.

An upwardly extending lug 32 is formed at the rear end of the extension 22. As best shown in Figure 2, this extension is formed so as to not interefere with the movement of the rear bearing bracket 24. A forward abutting face is formed on the lug 32, positioned to engage a pin 33, extending laterally from a lug 34, formed on the supporting bracket 11. Engagement of the lug 32 with the pin 33 limits the downward movement of the forward end of the divider. This is a very desirable feature as otherwise the forward end of the divider would drop into a deep hole in the soil or into a gully and would not lift when the depression had been passed.

In order to hold the divider in a substantially horizontal position against the bolt formed by the stop 30 a spring 35 wound around the pin 33, is provided with downward extensions abutting against the plate 25 below the axis of the pin 23 and an upper portion above the axis of the pin 23 which is adjustably secured to the supporting member 20 by a threaded attaching member 36. By adjustment of the nuts on the member 36 the tension of the spring may be varied.

From the above detailed description the operation of the device will be apparent. The shoe 28, during forward travel of the machine, rides along the surface of the ground. It will be noted that said shoe is provided with a forward engaging point and a ground engaging runner surface rearwardly of said point. The point, therefore, tends to penetrate the soil with the runner portion serving as a gauge. Upon encountering transverse depressions or irregularities in the ground level the divider may tip up and down about the pin 19 as an axis. As previously mentioned, the downward dip is limited by the lug 32 which serves as a stop when it abuts the pin 33. This prevents the shoe 28 from digging into the soil after a deep depression has been passed. There is also another kind of irregularity, that is, a sloping laterally, particularly the side hill slope along row crop plants. When the shoe 28 encounters such irregularities the entire divider tilts about the pin 23 as an axis. This movement is limited by the bolt 30 which serves as a stop. The spring 35 tends to hold the divider in normal horizontal position with the inner side closely adjacent the ground level.

The rods 29 are arranged closely adjacent the picking spindles of the cotton picker drum. This construction is provided in order to deliver any material or portions of the plant lifted by the divider into close proximity to the picking spindles, whereby any cotton contained in the material will be engaged by the picking spindles. The rods are positioned at their rear end, as shown in Figure 2, somewhat above the lowermost row of picking spindles whereby, during any position of tilting or tipping of the dividers, the rear ends of the rods will still deliver the material sliding therefrom into close proximity to the picking spindles. This is an important feature as there may be considerable loose cotton or loose branches on the plants which might otherwise be directed under the lowermost row of spindles and would not, therefore, be operated upon.

The device shown in Figures 4, 5 and 6, is a modified form of a plant lifting and guiding device which may be used in the same construction shown in Figures 1, 2 and 3 or may be used as well as the divider shown with the cotton picker for any purpose where such a device may be found useful.

The frame structure 37 of a machine to which the device may be attached forms a means of support for a supporting bracket 38. A bearing bracket 39, rigidly secured to the bracket 38, forms a support for a transverse pin 40. The pin 40 provides a pivotal support for a member 41. Said member in normal position has a main portion extending upwardly at a forward angle. At its upper end said member has an ear 42 formed with a horizontal downwardly extending bore through which a pivot pin 43 extends. Said pin also extends through a bearing bracket 44, which is rigidly secured to a shield 45. Said shield has a substantially vertical portion and a curved over downwardly inclined horizontal portion. At its lower end the shield which extends closely adjacent the ground level, is secured to a bracket 46. A pin 47 formed on said bracket, extends through a bearing member 48 rigidly attached to the shoe 49 of the device. Said shoe is formed with a pointed nose member and a rearwardly extending runner member welded together to form an integral structure. The runner portion is bent upwardly at the rear and is rigidly secured to a forwardly and downwardly extending portion 50 of the member 41. From this description it will be understood that the shield 45 rocks about a downwardly inclined forwardly extending axis on a line formed by the center of the pin 43 and the pin 47, said pins being positioned in alignment. To hold the shield 45 resiliently in position an I-bolt 51 is pivoted on a pin 52 mounted in spaced lugs 53 secured to the vertical portion of the shield. The bolt 51 extends through openings formed in webs 54 and 55, said webs being integral with the member 41. A spring 57 on the bolt 51 abuts a pair of nuts 56 threaded on the outer end of the bolt and against the inner side of the web 55. The opening formed in the web 54 is larger than the outer diameter of the spring and the nuts 56, whereby said elements may move freely through the opening. By adjustment of the nuts 56 the tension of the spring for holding the shield in position may be varied. To limit the up and down movement of the entire divider which pivots about the pin 40, a slot 59 is formed in a forwardly extending portion 60 of the supporting bracket 38. A pin 61 formed on the member 41 is positioned in the slot 59, and may rock to and fro in said slot during tipping movement of the divider. The length of the slot determines the amount of angular movement permitted by the divider.

In the divider the plant lifting device shown in Figures 4, 5 and 6, it will be understood that the shoe or grain engaging portion of the divider is pivoted only on a transverse axis and may ride up and down about that axis to pass over the irregularities in the ground level. However, the shield portion 45 is pivotally mounted on an inclined longitudinal axis. It is, therefore, evident that the shield 45 may pivot about its axis to accommodate plants being engaged by the divider. The spring 57 permits the shield to be pressed downwardly inwardly to prevent injury to the plants while dragging them to the throat of the machine. It is understood, of course, that two such elements as illustrated are to be used in a single machine, a throat being formed between the two dividers.

The operation of both forms of plant lifting devices has been explained in connection with the description of the devices. It is to be understood that although only two embodiments of the invention have been illustrated, applicant claims as his invention any construction embodying the novel principles disclosed and described and set forth in the appended claims.

What is claimed is:

1. An attachment for implements designed to operate on row crops longitudinally of the rows, comprising in combination with the frame structure of the implement, a soil engaging arm pivoted thereto on axes transverse and substantially parallel with respect to the rows, said arm being positioned to operate along one side of a row.

2. An implement for operating on row crops during movement parallel to the rows, comprising a frame structure and a soil engaging arm pivoted to the frame structure on axes parallel and transverse with respect to the rows and extending forwardly therefrom, said arm being positioned to engage the plants in a row.

3. A plant engaging shoe for row crop implements operated along rows with movement parallel thereto, comprising in combination with the frame structure of an implement, a bracket adapted to be secured to the frame structure, a supporting member pivoted to the bracket upon an axis extending in the same direction as the rows, and a soil engaging member pivoted to the supporting member on an axis transverse with respect to the rows.

4. In a cotton picker having a frame structure formed with a throat through which the rows of plants to be operated on are passed and in combination therewith, picking mechanism associated with the throat, and plant guiding and lifting arms pivoted to the frame structure at the sides of the throat on transverse and longitudinal axes with respect to the line of movement of the throat with respect to the rows of plants.

5. In a cotton picker having a frame structure formed with a throat through which the plants to be operated on are passed during movement of the picker along rows of plants, and picking mechanism associated therewith, plant lifting means comprising plant gathering and lifting members pivoted to the frame structure at the sides of the throat on transverse and longitudinal axes with respect to the path of travel of the picker, and means for resiliently resisting movement of the members in one angular direction about the longitudinal axis.

6. An attachment for implements designed to operate on row crops comprising, in combination with the frame structure of the implement, a plant engaging member extending forwardly therefrom, and means for connecting said member to the frame for movement relative thereto about transverse and longitudinal axes relative to its direction of extension from the implement.

EDWARD A. JOHNSTON.